United States Patent [19]
Yong

[11] Patent Number: 5,939,971
[45] Date of Patent: Aug. 17, 1999

[54] INFRARED BOLOMETER

[75] Inventor: Yoon-Joong Yong, Seoul, Rep. of Korea

[73] Assignee: Daewoo Electronics Co., Ltd., Rep. of Korea

[21] Appl. No.: 09/203,561

[22] Filed: Dec. 2, 1998

[51] Int. Cl.[6] .................................................. H01L 31/08
[52] U.S. Cl. ............................................... 338/15; 338/18
[58] Field of Search ................................. 338/15, 17, 18, 338/19, 22 R; 250/338.1, 338.4

[56] References Cited

U.S. PATENT DOCUMENTS

| | | | |
|---|---|---|---|
| 3,415,994 | 12/1968 | Fitti, Jr. | 250/83.3 |
| 5,300,915 | 4/1994 | Higashi et al. | 338/22 R |
| 5,302,933 | 4/1994 | Kudo et al. | 338/18 |
| 5,426,412 | 6/1995 | Tomonari et al. | 338/18 |
| 5,584,117 | 12/1996 | Lee et al. | 29/620 |

*Primary Examiner*—Lincoln Donovan
*Assistant Examiner*—Richard Lee
*Attorney, Agent, or Firm*—Pennie & Edmonds LLP

[57] ABSTRACT

A three-level infrared bolometer including an active matrix level, a support level, posts and an absorption level. The active matrix level includes a substrate having an integrated circuit, connecting terminals and a protective layer covering the substrate. The support level includes bridges, each of the bridges being provided with a conduction line formed on top thereof, wherein one end of the conduction line is electrically connected to the respective connecting terminal. The absorption level includes an absorber, a bolometer element surrounded by the absorber, a titanium thin film on top of the absorber, and an infrared absorber coating made of silicon oxy-nitride and formed on top of the titanium thin film, the infrared absorber coating having multipores therein and a rough top surface as a result of the titanium film surface not providing enough nucleation sites for it to grow stably. Each of posts includes an electrical conduit surrounded by an insulating material and is placed between the absorption level and the bridge, in such a way that the serpentine bolometer element is electrically connected to the integrated circuit through the electrical conduit, the conduction line and the connecting terminal.

7 Claims, 13 Drawing Sheets

INFRARED BOLOMETER

FIELD OF THE INVENTION

The present invention relates to an infrared bolometer; and, more particularly, to a three-level infrared bolometer.

BACKGROUND OF THE INVENTION

Bolometers are energy detectors based upon a change in the resistance of materials (called bolometer elements) that are exposed to a radiation flux. The bolometer elements have been made from metals or semiconductors. In metals, the resistance change is essentially due to variations in the carrier mobility, which typically decreases with temperature. Greater sensitivity can be obtained in high-resistivity semiconductor bolometer elements in which the free-carrier density is an exponential function of temperature, but thin film fabrication of semiconductor for bolometers is a difficult problem.

Figure 1:
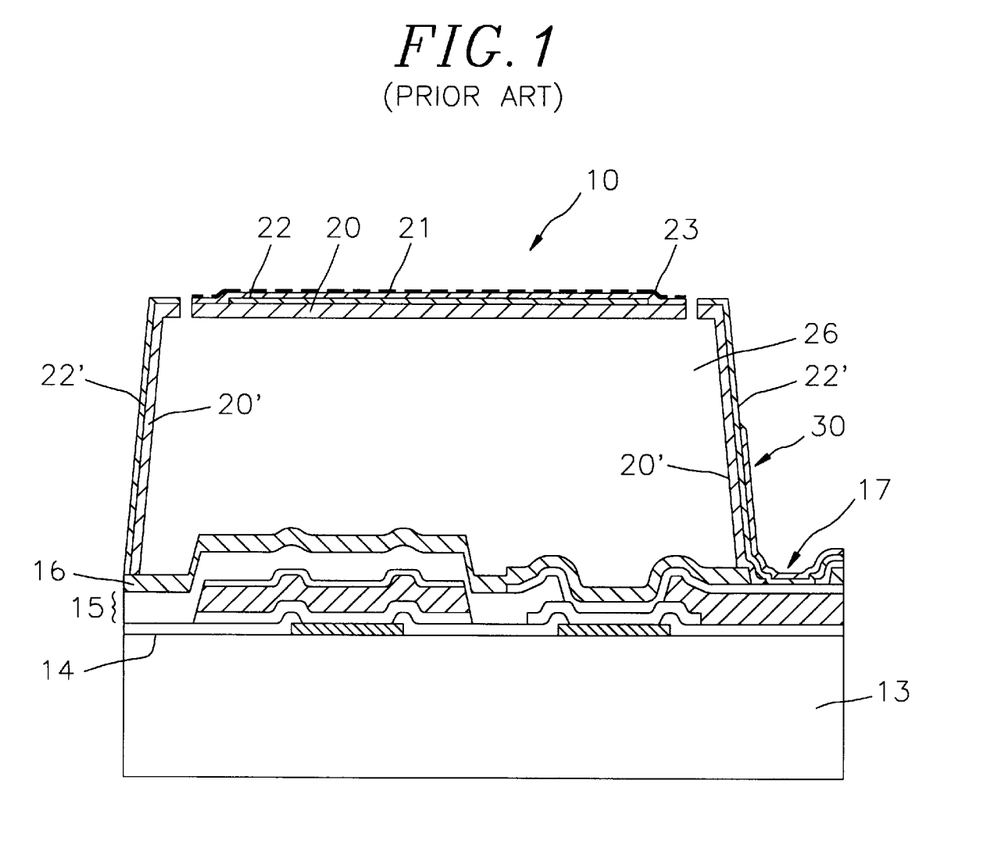
FIG. 1 present a schematic cross sectional view illustrating a two-level microbridge bolometer previous disclosed.
Figure 2:
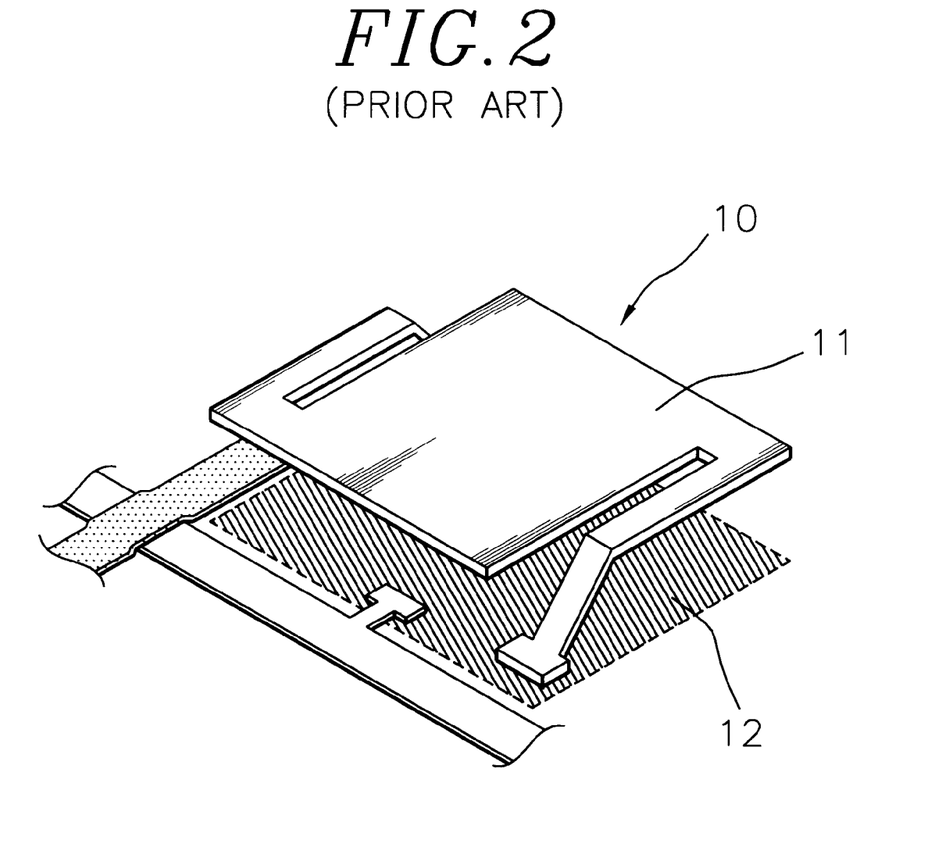
FIG. 2 shows a perspective view setting forth the two-level microbridge bolometer shown in FIG. 1.

FIGS. 1 and 2 are a cross sectional and a perspective views illustrating a two-level bolometer 10, disclosed in U.S. Pat. No. 5,300,915 entitled "THERMAL SENSOR", the bolometer 10 including an elevated microbridge detector level 11 and a lower level 12. The lower level 12 has a flat surfaced semiconductor substrate 13, such as a single crystal silicon substrate. The surface 14 of the silicon substrate 13 has fabricated thereon several components of an integrated circuit 15 including diodes, x and y bus lines, connections, and contact pads at the ends of the x and y bus lines, the fabrication following conventional silicon IC technology. The integrated circuit 15 is coated with a protective layer of silicon nitride 16. The valley strip 17 is the area not covered by the elevated detector.

The elevated detector level 11 includes a silicon nitride layer 20, a serpentine metallic resistive path 21, a silicon nitride layer 22 over the layers 20 and 21, and an infrared absorber coating 23 (hereinafter, "IR absorber coating") over the silicon nitride layer 22. Downwardly extending silicon nitride layers 20' and 22' deposited at the same time during the fabrication make up the four sloping support legs for the elevated detector level 11. The number of support legs may be greater or less than four. The cavity 26 between the two levels is ambient atmosphere. During the fabrication process, however, the cavity 26 was originally filled with a previously deposited layer of easily dissolvable glass or other dissolvable material until the layers 20, 20' and 22, 22' were deposited. Subsequently in the process the glass was dissolved out to leave the cavity.

Figure 3:
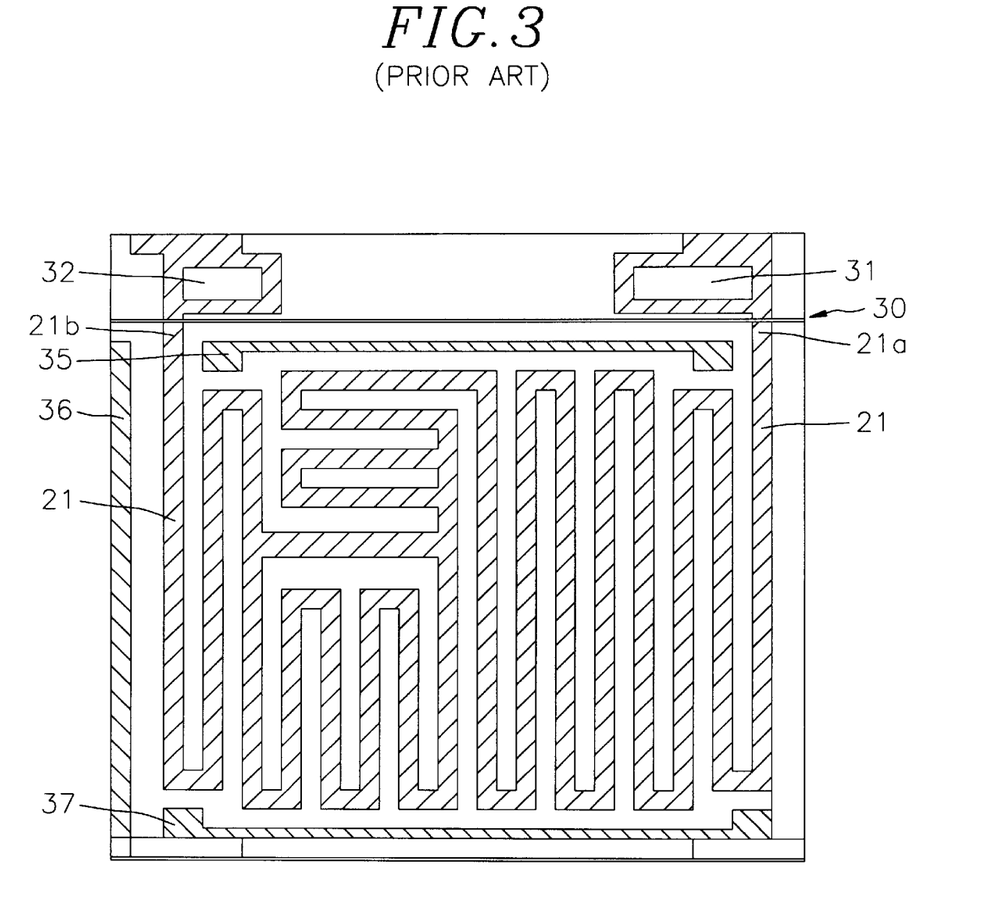
FIG. 3 produces a top view depicting an elevated detector level in FIG. 1.

In FIG. 3, there is a top view depicting the elevated detector level 11 shown in FIG. 1. This drawing is made as though the overlying absorber coating 23 and the upper silicon nitride layer 22 are transparent so the serpentine resistive layer path 21 can be shown. The ends 21a, 21b of the resistive path 21 are continued down the slope area 30 to make electrical contact with pads 31 and 32 on the lower level 12. FIG. 3 also shows the nitride window cuts 35, 36 and 37 which are opened through the silicon nitride layers 20 and 22 to provide access to the phosphor-glass beneath for dissolving it from beneath the detector plane. The nitride window cuts 35, 36, 37 to provide this access are narrow and are shared with adjacent pixels on the sides, thus maximizing the area available to the detector and thus maximizing the fill-factor. The four supporting bridges may be short or as long as necessary to provide adequate support and thermal isolation.

One of the shortcomings of the above described bolometer is its less than optimum fill factor resulting from the presence of the bridges on same level as the elevated microbridge detector level, which, in turn, reduces the total area for IR absorbing, i.e., the fill factor.

SUMMARY OF THE INVENTION

It is, therefore, an object of the present invention to provide a three-level infrared bolometer having an increased fill factor and an improved absorbance.

In accordance with one aspect of the present invention, there is provided a three-level infrared bolometer, the bolometer comprising: an active matrix level, the active matrix level including a substrate and at least a pair of connecting terminals, wherein the pair of connecting terminals are formed on top of the substrate, a support level provided with at least a pair of bridges, each of the bridges including an conduction line, one end of the conduction line being electrically connected to the respective connecting terminal, an absorption level, the absorption level including an absorber, a bolometer element surrounded by the absorber, a thin film on top of the absorber, and an infrared absorber coating formed on top of the thin film, the infrared absorber coating having multipores therein and a rough top surface, and at least a pair of posts, each of the posts being placed between the absorption level and the support level and including an electrical conduit surrounded by an insulating material, each end of the bolometer element of the absorption level being electrically connected to the respective connecting terminal through the respective electrical conduit and the respective conduction line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 4:
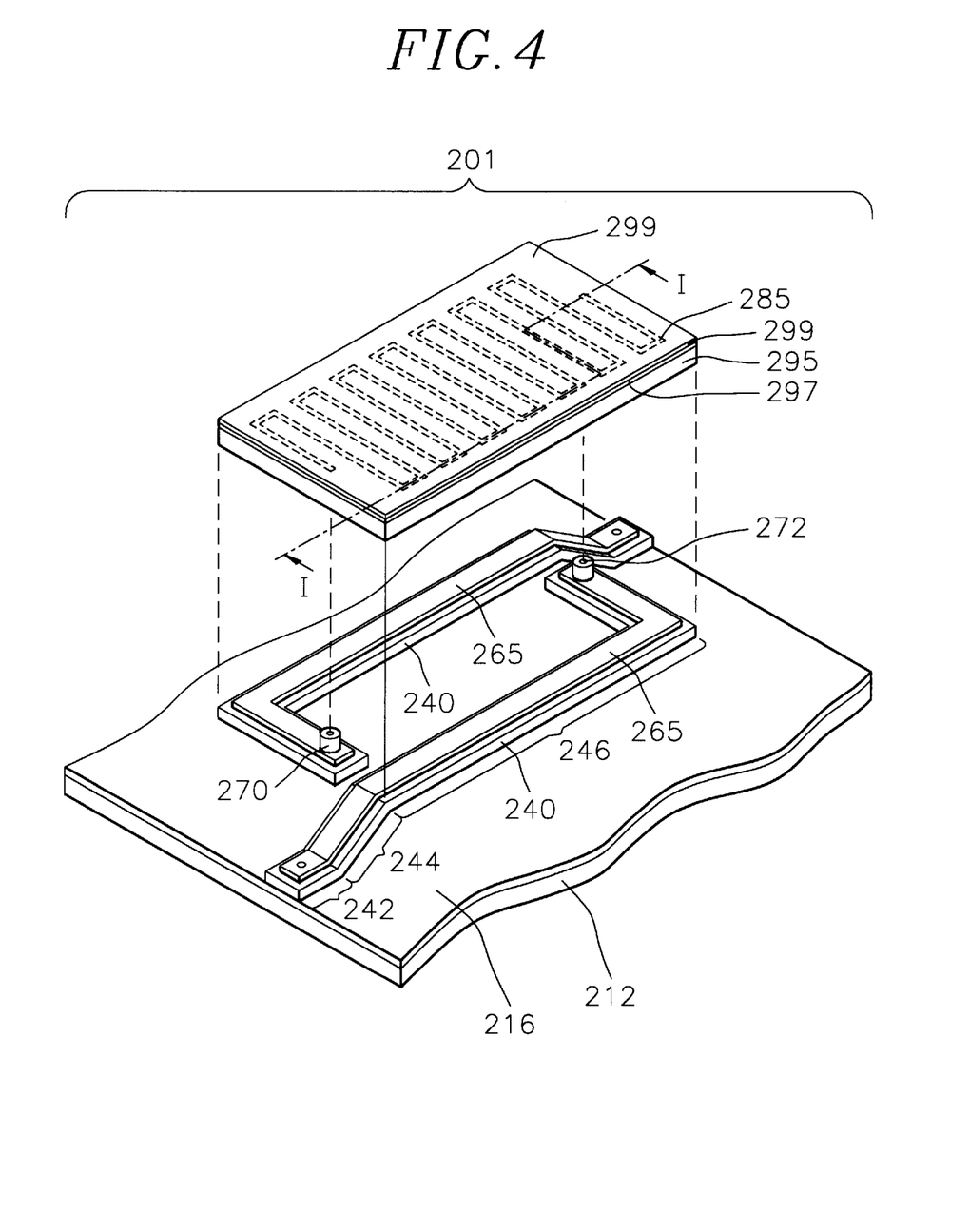
FIG. 4 shows a perspective view setting forth a three-level infrared bolometer in accordance with the present invention.
Figure 5:
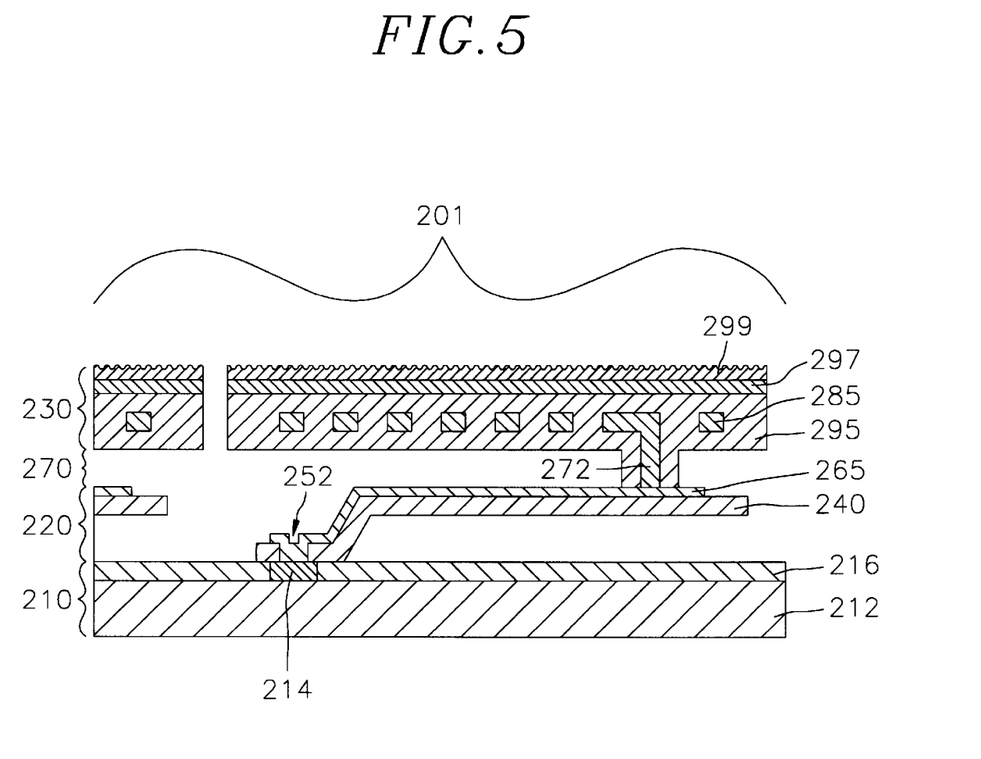
FIG. 5 presents a schematic cross section view depicting the three-level infrared bolometer taken along I—I in FIG. 4.

There are provided in FIGS. 4 and 5 a perspective view illustrating a three-level infrared bolometer 201 in accordance with the present invention and a schematic cross sectional view taken along I—I in FIG. 4, respectively. It should be noted that like parts appearing in FIGS. 4 and 5 are represented by like reference numerals.

The inventive bolometer 201 shown in FIGS. 4 and 5 comprises an active matrix level 210, a support level 220, at least a pair of posts 270 and an absorption level 230.

The active matrix level 210 has a substrate 212 including an integrated circuit (not shown), a pair of connecting terminals 214 and a protective layer 216. Each of the connecting terminals 214 made of a metal is located on top of the substrate 212. The protective layer 216 made of, e.g., silicon nitride covers the substrate 212. The pair of connecting terminals 214 are electrically connected to the integrated circuit.

The support level 220 includes a pair of bridges 240 made of silicon nitride ($SiN_x$), each of the bridges 240 having a conduction line 265 formed on top thereof. Each of the bridges 240 is provided with an anchor portion 242, a leg portion 244 and an elevated portion 246, the anchor portion 242 including a via hole 252 through which one end of the conduction line 265 is electrically connected to the connecting terminal 214 and the leg portion 244 supporting the elevated portion 246.

The absorption level 230 is provided with an absorber 295 made of a heat absorbing material, e.g., silicon oxide ($SiO_2$), a serpentine bolometer element 285 made of, e.g., titanium (Ti) and surrounded by the absorber 295, a thin film 297 made of, e.g., titanium (Ti) formed on top of the absorber 295 and an IR absorber coating 299 formed on top of the titanium thin film 297.

Each of the posts 270 is placed between the absorption level 230 and the support level 220. Each of the post 270 includes an electrical conduit 272 made of a metal, e.g., titanium (Ti) and surrounded by an insulating material. Top end of the electrical conduit 272 is electrically connected to one end of the serpentine bolometer element 285 and bottom end thereof is electrically connected to the conduction line 265 on the bridge 240, in such a way that both ends of the serpentine bolometer element 285 in the absorption level 230 is electrically connected to the integrated circuit of the active matrix level 210 through the electrical conduits 272, the conduction lines 265 and the connecting terminals 214.

When the infrared energy is absorbed, the resistivity of the serpentine bolometer element 285 is changed, wherein the changed resistivity causes a current and a voltage to vary. The varied current or voltage is amplified by the integrated circuit in such a way that the amplified current or voltage is read out by a detective circuit (not shown).

The method for manufacturing the inventive infrared bolometer will now be described with reference to FIGS. 6A to 6L.

Figure 6A:
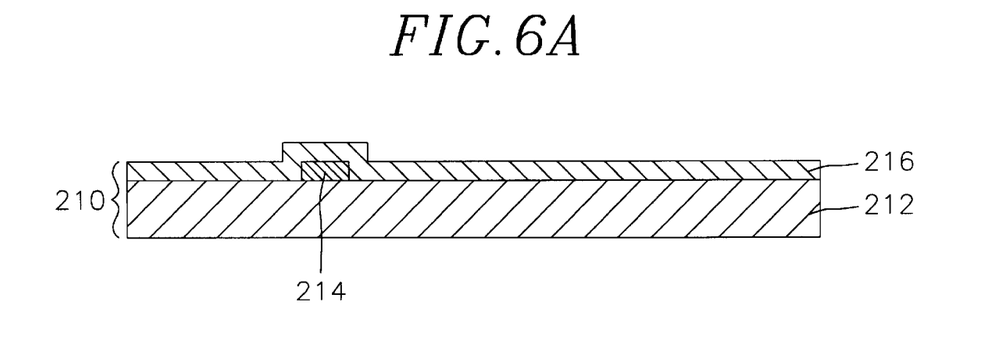
FIGS. 6A to 6L provides schematic cross sectional views illustrating a method for manufacturing the three-level infrared bolometer in FIG. 5.

The process for the manufacture of the bolometer 201 begins with the preparation of the substrate 212 including the integrate circuit and the pair of connecting terminals 214.

Subsequently, the protective layer 216 made of, e.g., silicon nitride ($Si_3N_4$), is deposited on top of the substrate 212 by using a plasma enhanced chemical vapor deposition (PECVD) method to thereby form an active matrix level 210, as shown in FIG. 6A.

Figure 6B:
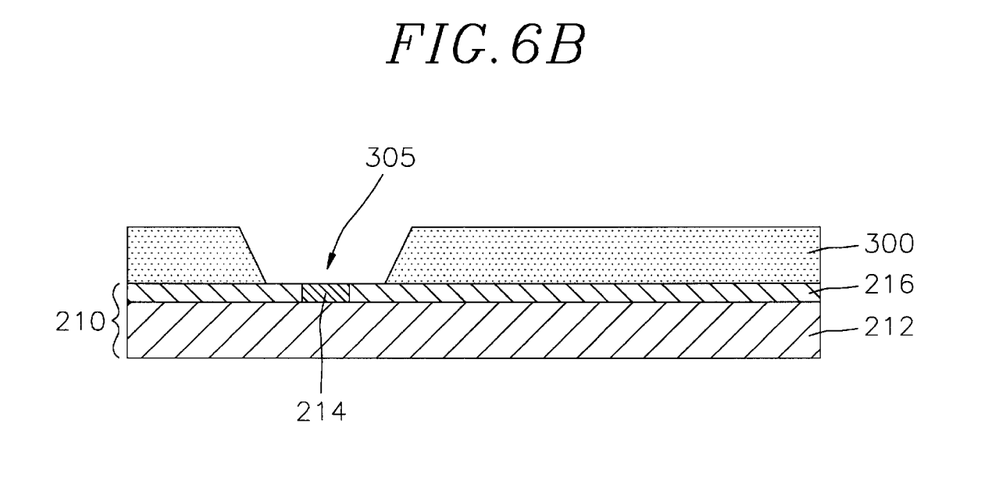

In a next step, a first sacrificial material (not shown) comprising, e.g., poly-Si, is deposited on top of the protective layer 216 by using a low pressure chemical vapor deposition (LPCVD) method so as to have a flat top surface. The first sacrificial material is then removed, selectively, to form a first sacrificial layer 300 including a pair of cavities 305 by using an etching method, as shown in FIG. 6B.

Figure 6C:
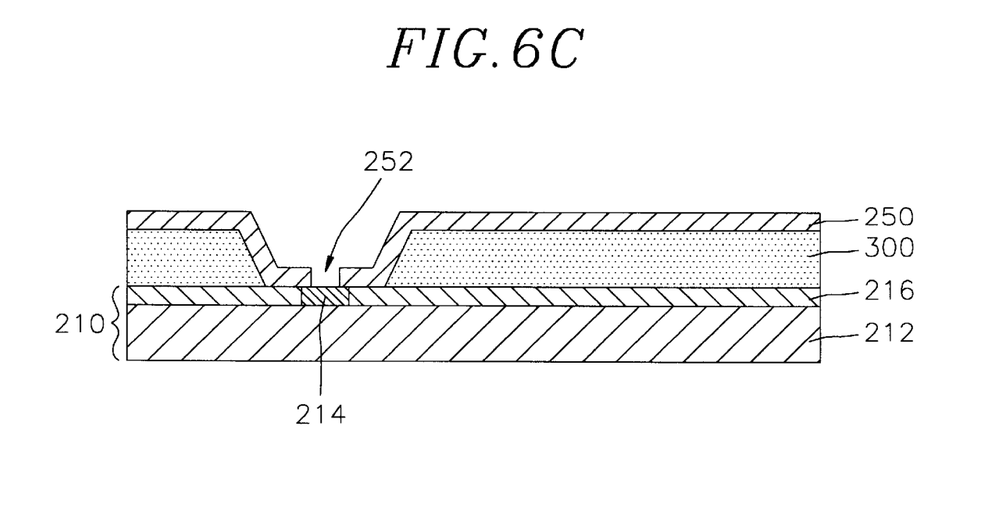

Next, a support layer 250 made of, e.g., silicon nitride ($SiN_x$), is deposited on top of the first sacrificial layer 300 including the cavities 305 by using the PECVD method.

Subsequently, a pair of via holes 252 are formed in the support layer 250 to expose the connecting terminals 214, as shown in FIG. 6C.

Figure 6D:
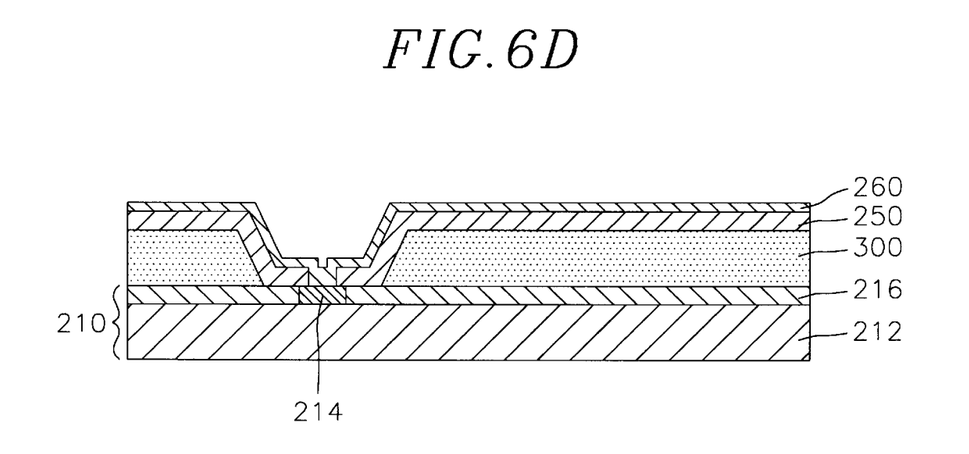

Thereafter, a conductive layer 260 made of a metal, e.g., Ti, is deposited on top of the support layer 250 including the via holes 252 by using a sputtering method, wherein the via holes 252 are filled with the metal constituting the conductive layer 260 thereby electrically connecting the conductive layer 260 to the connecting terminals 214, as shown in FIG. 6D.

Figure 6E:
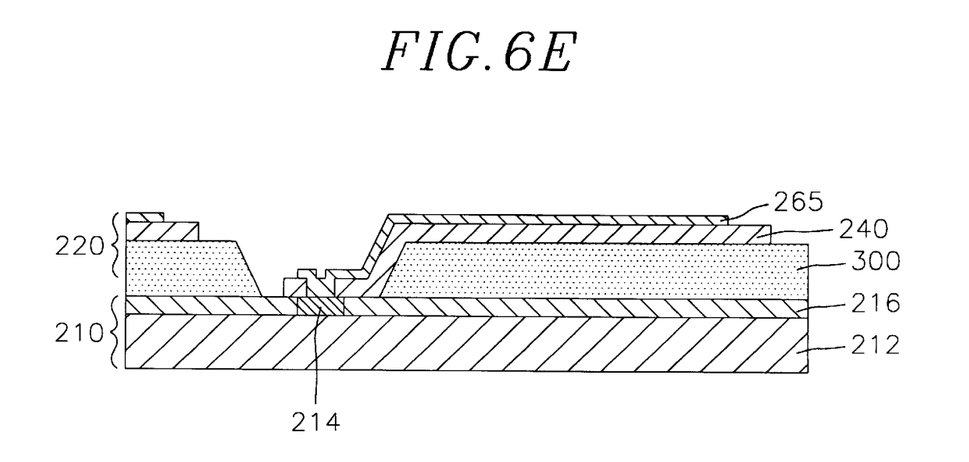

Then, the conductive layer 260 and the support layer 250 are patterned into the pair of conduction lines 265 and the pair of bridges 240 by using a metal etching method and a nitride etching method, respectively, to thereby form the support level 220, as shown in FIG. 6E.

Figure 6F:
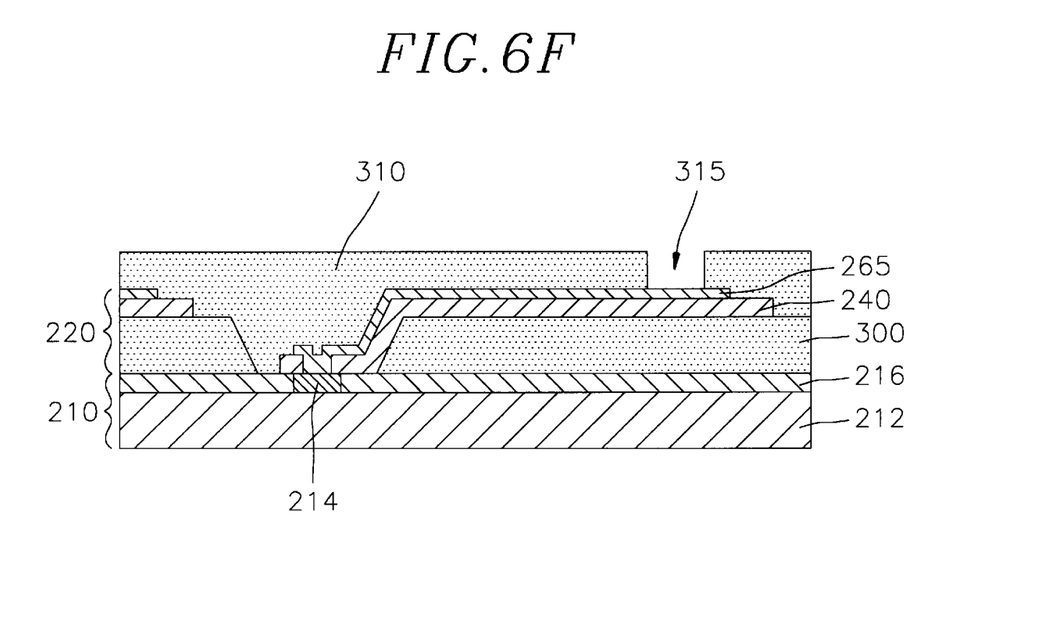

In a subsequent step, a second sacrificial material (not shown) comprising, e.g., a poly-Si, is deposited on top of the bridges 240 and the first sacrificial layer 300 by using the LPCVD method so as to have a flat top surface. The second sacrificial material is then removed, selectively, to form a second sacrificial layer 310 including a pair of holes 315 by using the etching method, as shown in FIG. 6F.

Figure 6G:
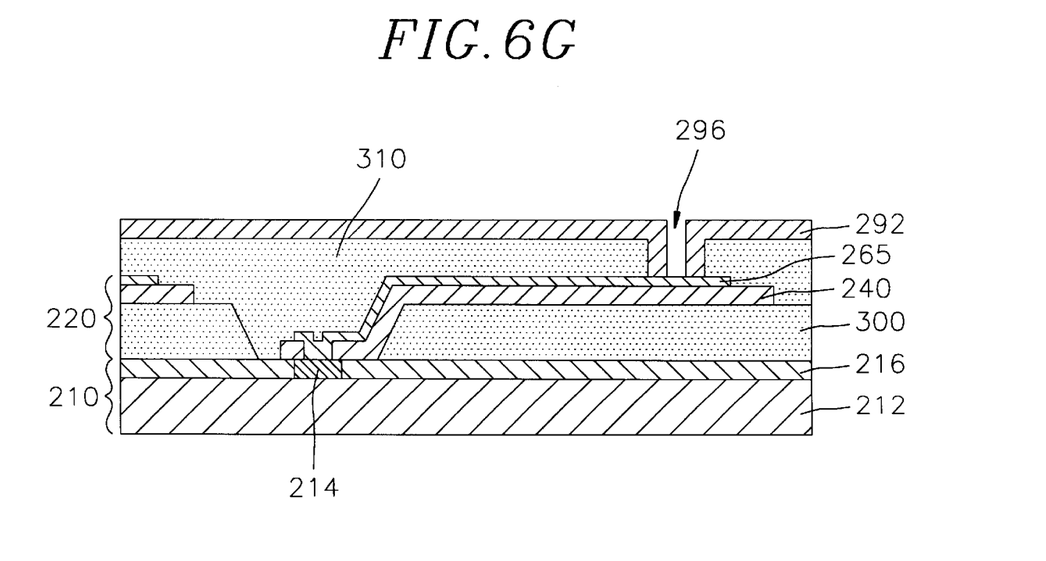

In a following step, a first absorption material 292, e.g., $SiO_2$, is deposited on top of the second sacrificial layer 310 including the holes 315 by using a PECVD method.

Next, the first absorption material 292 is partially etched so as to have a pair of aperture 296 whereby the conduction lines 265 are partially exposed, as shown in FIG. 6G.

Figure 6H:
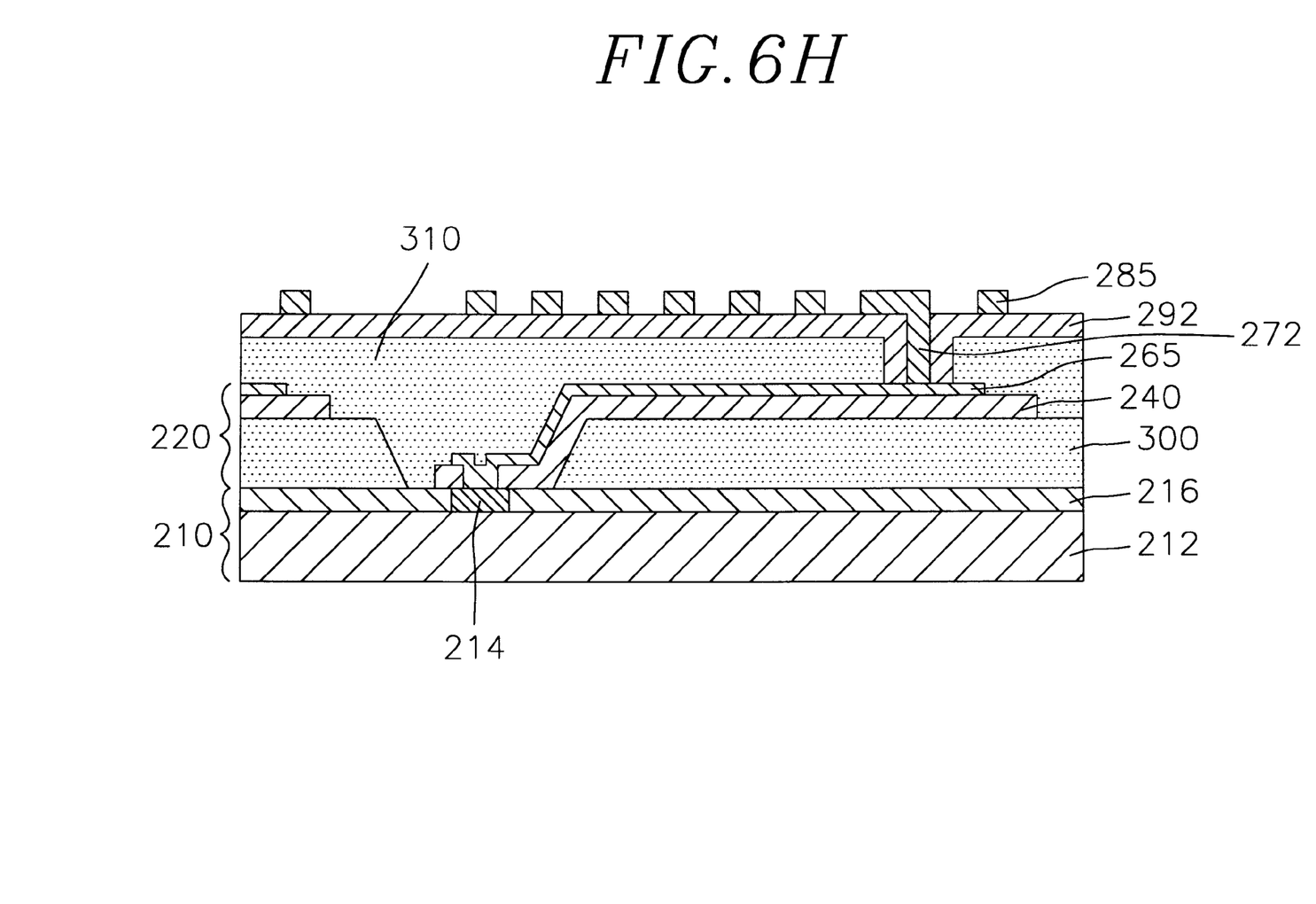

Thereafter, a bolometer element layer (not shown) made of, e.g., titanium (Ti), is deposited on top of the first absorption material 292 including the apertures 296 by using the sputtering method, wherein the apertures 296 are filled with the bolometer element layer, thereby forming a pair of electrical conduits 272. The bolometer element layer is then patterned into a serpentine bolometer element 285 by using the metal etching method, as shown in FIG. 6H.

Figure 6I:
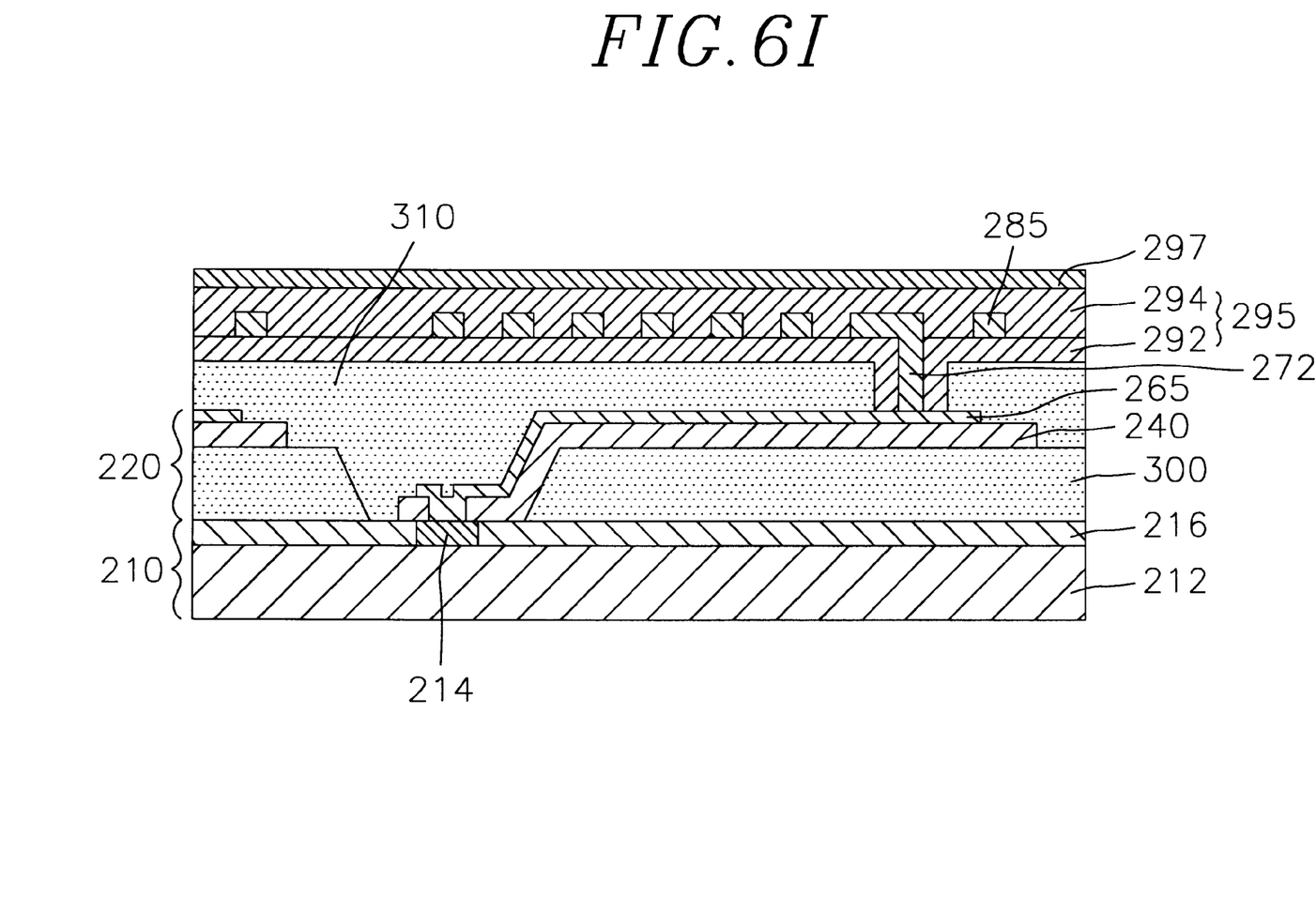

Subsequently, a second absorption material 294 made of the same material as the first absorption material 292 is deposited on top of the serpentine bolometer element 285 to thereby form the absorber 295, as shown in FIG. 6I, wherein the absorber 295 surrounds the serpentine bolometer element 285. Then, the thin film 297 made of, e.g., titanium, is deposited on top of the absorber 295 by using the sputtering method so as to have a thickness of the range, e.g., 10–10000 nm.

Figure 6J:
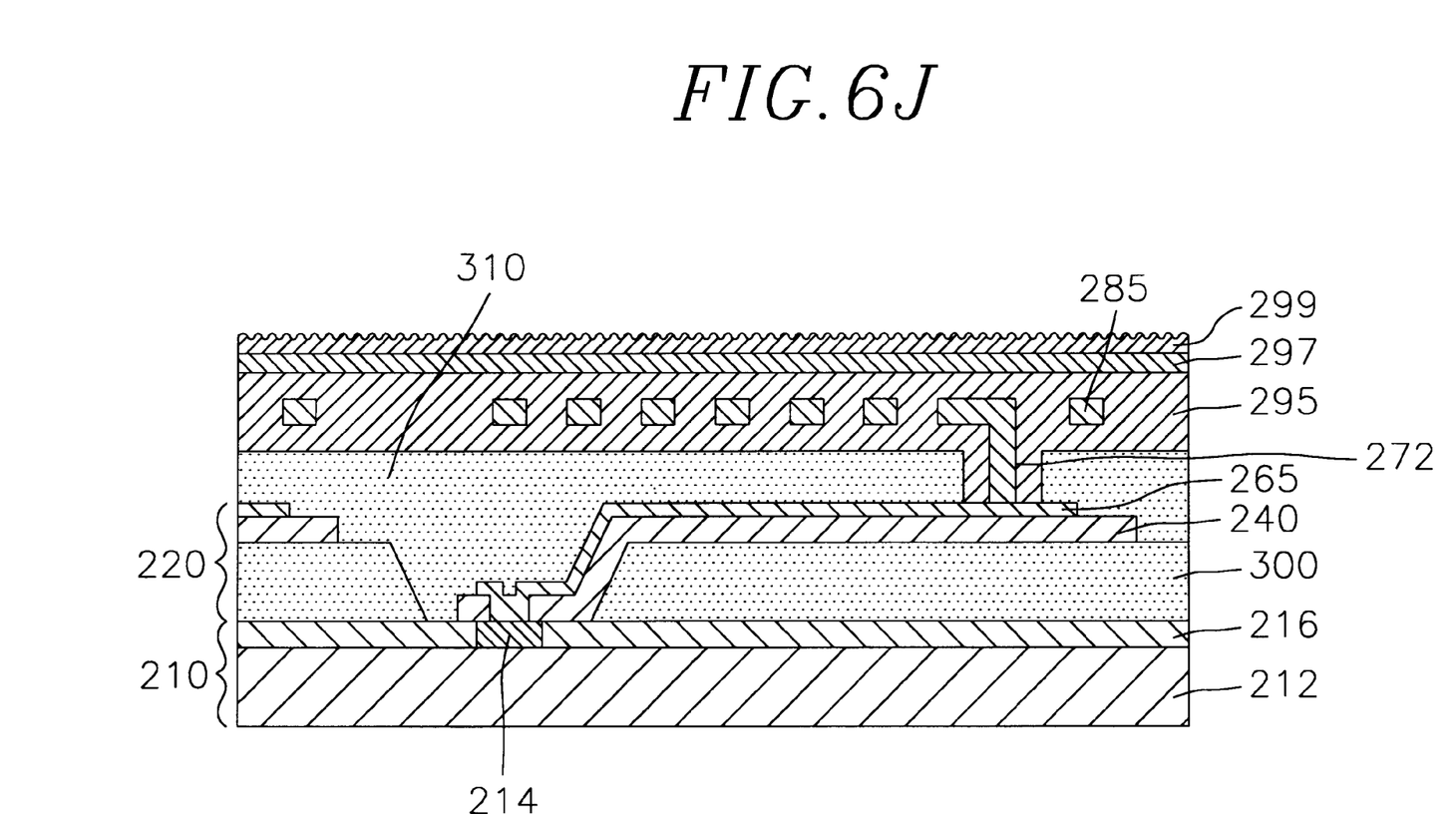

Next, with reference to FIG. 6J, the IR absorber coating 299 made of, e.g, silicon oxy-nitride ($SiO_xN_y$, herein, X=0.1–2.5, Y=0.0–2.0) is formed on top of the titanium thin film 297. It is well known that, when a layer made silicon oxynitride grows on a thin film made of titanium, the silicon oxy-nitride layer grows to a layer having multipores (not shown) therein and a rough top surface as a result of the titanium film surface not providing enough nucleation sites for it to grow stably. Accordingly, the IR absorber coating 299 in accordance with the present invention has multipores therein and a rough top surface. It should be noted that the rough top surface of the IR absorber coating 299 allows the IR absorber coating 299 to efficiently absorb the infrared energy. To be more specific, the IR absorber coating 299 having the rough top surface absorbs more infrared energy than that having a flat top surface, because the rough top surface allows the IR absorber coating 299 to reabsorb a part of the reflected infrared energy.

Figure 6K:
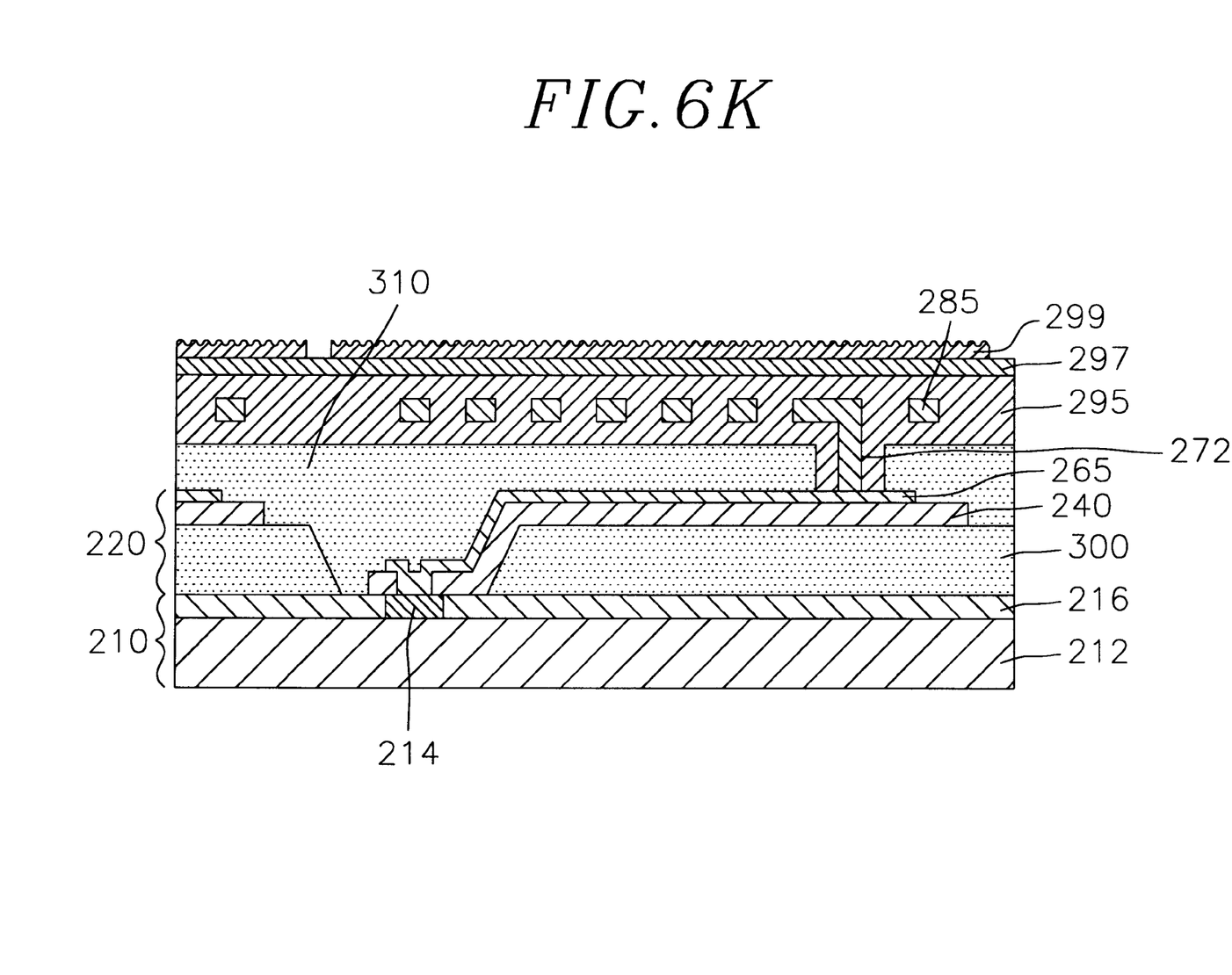

Furthermore, the IR absorber coating 299 is patterned using a partial etching method to expose a part of the titanium thin film 297, as shown in FIG. 6K.

Figure 6L:
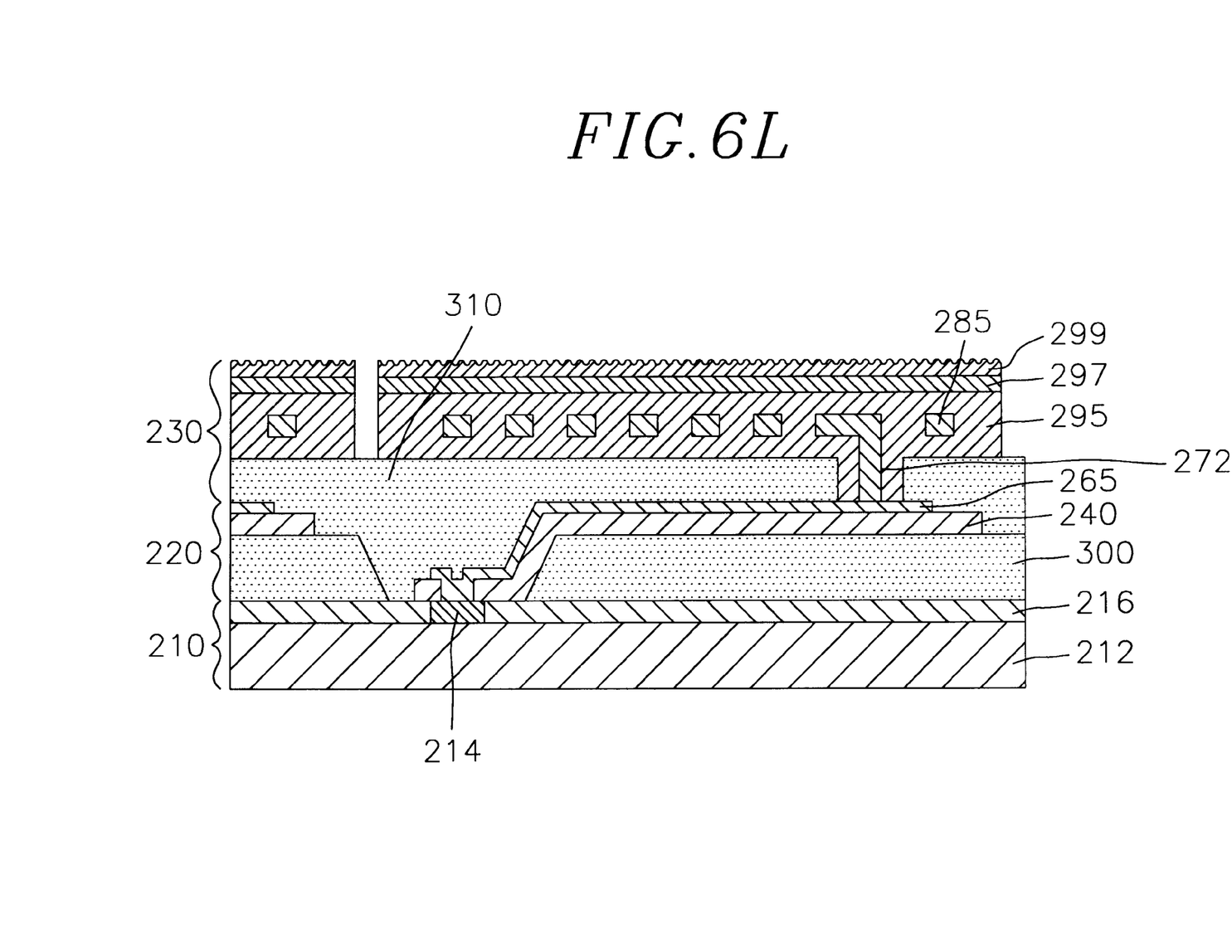

Thereafter, the exposed titanium thin film 297 and the absorber 295 are etched to thereby form an absorption level 230, as shown in FIG. 6L.

Finally, the second and the first sacrificial layers 310, 300 are removed by using an etching method to thereby form the three-level infrared bolometer 201, as shown in FIG. 5.

In the three-level infrared bolometer of the present invention, the bridges are positioned under the absorption level, allowing the absorption level to be fully utilized for IR absorption, which will, in turn, increase the fill factor thereof, and the infrared absorber coating has the rough top surface, improving the absorbing efficiency for infrared energy.

While the present invention has been described with respect to certain preferred embodiments only, other modifications and variations may be made without departing from the scope of the present invention as set forth in the following claims.

What is claimed is:

1. A three-level infrared bolometer, the bolometer comprising:

an active matrix level, the active matrix level including a substrate and at least a pair of connecting terminals, wherein the pair of connecting terminals are formed on top of the substrate;

a support level provided with at least a pair of bridges, each of the bridges including an conduction line, one end of the conduction line being electrically connected to the respective connecting terminal;

an absorption level, the absorption level including an absorber, a bolometer element surrounded by the absorber, a thin film on top of the absorber, and an infrared absorber coating formed on top of the thin film, the infrared absorber coating having multipores therein and a rough top surface; and at least a pair of posts, each of the posts being placed between the absorption level and the support level and including an electrical conduit surrounded by an insulating material, each end of the bolometer element of the absorption level being electrically connected to the respective connecting terminal through the respective electrical conduit and the respective conduction line.

2. The bolometer of claim 1, wherein the thin film is made of titanium and the infrared absorber coating is made of silicon oxy-nitride ($SiO_xN_y$).

3. The bolometer of claim 1, wherein each of the bridges is provided with an anchor portion, a leg portion and an elevated portion, the anchor portion including a via hole through which one end of the conduction line is electrically connected to the connecting terminal.

4. The bolometer of claim 1, wherein the conduction line is positioned on top of the bridges.

5. The bolometer of claim 1, wherein top end of the electrical conduit is electrically connected to one end of the bolometer element and bottom end of the electrical conduit is electrically connected to other end of the conduction line.

6. The bolometer of claim 1, wherein the conduction line, the electrical conduit and the bolometer element are made of the same metal.

7. The bolometer of claim 6, wherein the conduction line, the electrical conduit and the bolometer element are made of titanium.

* * * * *